UNITED STATES PATENT OFFICE.

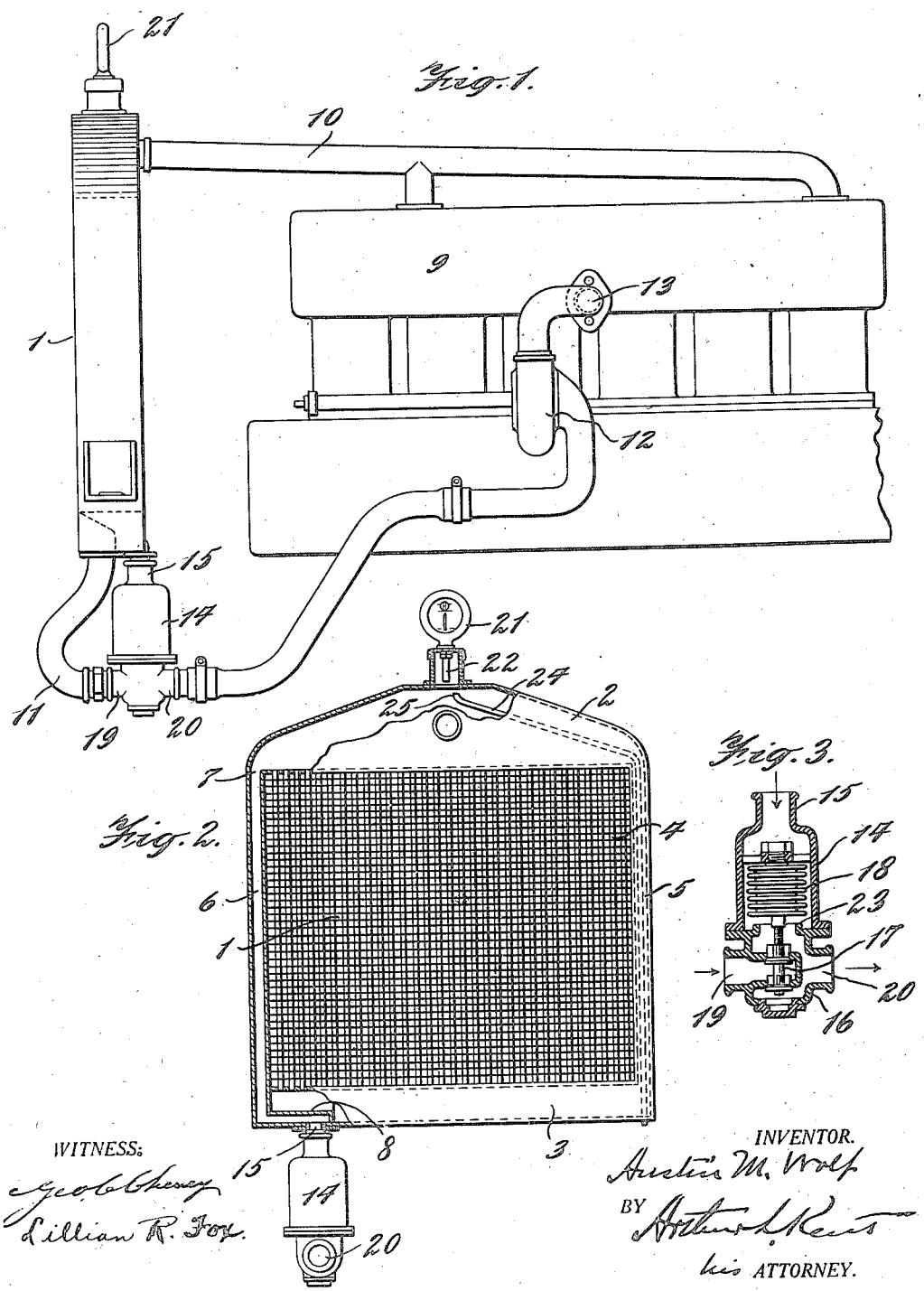

AUSTIN M. WOLF, OF PLAINFIELD, NEW JERSEY.

COOLING AND INDICATING SYSTEM FOR INTERNAL-COMBUSTION ENGINES.

1,400,925. Specification of Letters Patent. Patented Dec. 20, 1921.

Application filed January 22, 1919, Serial No. 272,428. Renewed March 18, 1921. Serial No. 453,481.

*To all whom it may concern:*

Be it known that I, AUSTIN M. WOLF, a citizen of the United States, residing at Plainfield, in the county of Union and State of New Jersey, have invented certain new and useful Improvements in Cooling and Indicating Systems for Internal-Combustion Engines, fully described and represented in the following specification and the accompanying drawings, forming a part of the same.

My invention relates to cooling and temperature indicating systems for internal combustion engines, especially designed for use in motor vehicles, although it may be adapted for other uses where conditions are similar.

The principal objects are to enable the temperature indicator to properly indicate engine temperature when the cooling fluid is circulating through different channels; and to make a more simple, compact and reliable arrangement of a circulation system which comprises automatic thermostatic control.

It has been customary in systems comprising thermostatic means for regulating the temperature of the cooling water, to provide a by-pass pipe leading from a point in the hot water return pipe between the engine jacket and the radiator to a point in the cold water supply pipe between the radiator and the engine jacket, with the thermostat located somewhere in this by-pass pipe, so that when the water is cold the by-pass is opened by the action of the thermostat and the water is circulated from the engine jacket through the by-pass and back again to the jacket without any considerable part of it passing through the radiator. In this way the relatively small portion of the water contained in the engine jacket, by-pass, and piping between the by-pass and the jacket, is heated as quickly as possible to engine temperature, and thereupon if the mechanism is in proper condition the by-pass is closed wholly or partially by the action of the thermostat and sufficient of the water is compelled to circulate through the radiator where it is cooled in a normal manner to prevent overheating of the engine.

It is also customary and desirable to employ in many cases a temperature indicator which is generally a thermometer, and the preferred and probably the only practical location for this is upon the radiator, so that the heat-responsive part of the thermometer is exposed to temperature conditions within the upper part of the radiator and preferably to the temperature of vapor above the water level, while the indicating part of the thermometer is in view of the driver from his seat. When such an indicator is employed with a circulation system such as described there is a failure to give a proper temperature indication when the engine is started cold, since there will then be no circulation in the neighborhood of the temperature indicator, and the rise of temperature which should occur up to the time when the thermostat closes the by-pass will not be indicated. Again, if the thermostat should fail to operate to close the by-pass at the proper time or at the proper temperature, the temperature indicator will fail to give any indication, or an adequate indication, of the difficulty.

To attain the objects and to avoid the difficulties indicated, I provide an arrangement of parts in which hot water from the engine jacket is carried through a certain passage or to a certain container such as the upper part of the radiator regardless whether the by-pass is open or closed, and locate an indicating thermometer with its heat responsive part in such passage or container. The thermometer will thus give the proper temperature indication, showing to the driver the heat condition of the engine, at all times. The bringing of all of the heated water in circulation to the upper radiator tank permits the thermometer to be mounted in a most favorable location both with respect to its observation by the driver and with respect to the location of its heat-responsive element in a position where it may be exposed to vapor above the heated water rather than where it must be submerged in the water. By such a location of the heat-responsive element the thermometer indicates correctly the heat condition of the system at all times. The invention, therefore, provides for locating the temperature indicator so as to retain the advantage of indicating vapor temperature of the system, in connection with the other advantages described.

A passage is provided from the radiator back to the bottom of the engine jacket by way of the pump substantially as usual, and the by-passage is arranged so that by-pass water is taken from a point in the upper part of the radiator and conveyed past a thermostat to a suitable point in the main passage leading from the radiator to the jacket. More particularly I prefer to arrange the by-passage within the radiator casing and usually to form the radiator structure itself so that it provides a by-pass which connects with the main pipe from the radiator to the pump at a point close to the radiator. In this arrangement the external part of the by-pass is only of such extent as is required for the location of the thermostat.

I will now describe one exemplifying structure embodying the invention and will point out some of the variations in detail that may be made, but after considering this description in connection with the drawing, persons skilled in the art will understand how other modifications may be made within the invention; and I do not limit myself to details except as claimed. In said drawing:—

Figure 1 is a side elevation of an engine, radiator and other parts sufficient to show one embodiment of the invention;

Fig. 2 is a front elevation; and

Fig. 3 is a vertical section through the thermostat casing.

The radiator 1 comprises an upper water compartment or tank 2 and a lower compartment or tank 3, connected by a "core" 4 through which water flows from the upper tank to the lower for the normal cooling action. Radiators usually have within their casings side compartments 5 which may be empty or may be filled with water to provide additional capacity. One of these arranged as usual is indicated at the right in Fig. 2. At the left this space is utilized by re-adapting it to provide a passage or by-pass 6 communicating with the upper tank 2 at 7 and shut off entirely from the lower tank 3 by a partition 8.

The engine water jacket 9 is connected with the upper radiator tank by a water pipe 10 and water is conveyed from the lower tank 3 of the radiator by pipe or passage 11 to the pump 12 and thence to the lower part of the engine jacket at 13.

A thermostatic regulator of any suitable or well-known type is contained in a casing 14, the upper end of which connects with the radiator by-pass 6 at 15 and the lower end of which connects with the lower or cooled water pipe 11 by means of a fitting 16 containing a balanced valve 17. The stem of this valve is connected to the thermostatic element 18 which is in this case of the vapor-bellows type. This contracts when the water is cold and closes the balanced valve so that water cannot pass from the lower radiator tank 3 through the fitting 16. At the same time the by-passage from the upper tank 2 through the side passage 6, through the upper end of the thermostat casing 14, past the thermostat and out of the fitting 16 at 20 is opened by reason of the lower end of the thermostat 18 uncovering the valve seat 23; and this by-passage remains open and water circulates through it until properly warmed by the engine, whereupon the expansion of the thermostat sufficiently closes the by-passage by reason of the lower end of the thermostat approaching or engaging the seat 23, and at the same time sufficiently opens the valve 17 to cause enough water to circulate through the core of the radiator in the normal way to prevent overheating of the engine.

A temperature indicator 21 of well-known type is mounted on the radiator cap as usual, and from the previous explanation it is evident that its temperature-responsive part 22 within the upper portion of the upper tank is subjected to the temperature of the cooling water, or preferably to the temperature of vapor in the vapor space above the heated water, whether the water is going through the radiator core or through the by-passage. In case the thermostat fails to open its valve at the proper time, therefore, the consequent overheating of water will be quickly apparent to the driver.

The water level may be maintained in the upper tank at a point considerably below the heat-receiving element 22 of the thermometer by a vent pipe 24 terminating in the upper tank 2 at the point 25 and establishing a maximum water level at that point.

It will be noticed that the described arrangement substantially eliminates piping in addition to what is required without thermostatic control. The construction and arrangement of water passages may be varied somewhat, but as shown in the drawing, I usually prefer to make the by-passage 6 in the form of a modification of the radiator casing structure rather than in the form of a distinct pipe passing down either through or near the radiator casing from the upper tank 2. The location of the thermostat is probably the most convenient of the locations which may be provided for it and is preferred in this embodiment of the invention.

For the sake of brevity, throughout the specification and claims in most cases reference has been made to water as the cooling medium. Evidently, however, the invention will be operative with other cooling liquids in many cases.

What is claimed is:

1. In a cooling system for internal combustion engines, the combination with the engine water jacket, of a radiator comprising an upper and a lower tank connected by a radiating core, water passages comprising a normal circuit including said core and the engine jacket and a by-passage to eliminate the core, and a thermostat to control the course of water flow in accordance with the temperature, the water passages being arranged to cause all heated water returning from the engine jacket to pass through said upper tank.

2. In a cooling system for internal combustion engines, the combination with the engine water jacket, of a radiator comprising an upper and a lower tank and a core connecting them, a water passage leading from the water jacket to said upper tank, a water passage leading from said lower tank to the water jacket, a by-passage communicating with said upper tank and serving to return water therefrom to the water jacket without passing through said core, and a thermostat to control the flow of water through said by-passage and core.

3. In a cooling system for internal combustion engines, the combination with the engine jacket, of a radiator comprising an upper and a lower water tank, a core connecting said tanks and a by-passage leading through the radiator casing from the upper tank and separate from the core, a pipe connecting the lower tank with the engine jacket, a water passage connecting said radiator by-passage with said first-mentioned pipe, a thermostat responsive to temperature conditions in said by-passage for controlling the flow of water through said by-passage and core, and a pipe connecting the engine jacket with the upper radiator tank.

4. In a cooling system for motor vehicles, the combination with the engine water jacket, of a radiator comprising an upper and a lower tank, a radiating core affording normal circulation of water from the upper tank to the lower, a casing and a water by-passage within the casing near one side of the core, a pipe connecting said lower tank with the engine jacket, a thermostat housing connected at one end with said by-passage and connected at the other end with said pipe, a thermostat within the housing, valves controlled by the thermostat to open and close the main water passage and the by-passage in accordance with the water temperature, and means for conveying hot water from the engine jacket back to said upper tank regardless of the action of the thermostat so that a thermometer applied to said upper tank gives correct temperature indication under all conditions.

5. In a cooling and indicating system for internal combustion engines, the combination with the engine jacket, and a circulation system comprising a radiator and connecting passages between the radiator and the jacket and a by-passage to cut out the radiator, of thermostatically controlled means for controlling the direction of flow of the cooling medium through said system, and a temperature indicator, the circulation system including a part having a vapor space and through which cooling medium flowing from the jacket passes irrespective of change in direction of flow of the medium under the action of the thermostatically controlled means, and the temperature indicator having its heat-responsive element exposed to vapor in said vapor space.

6. In a cooling and indicating system for internal combustion engines, the combination with the engine jacket, and a circulation system comprising a radiator and connecting passages between the radiator and the jacket, of thermostatically controlled means for controlling the flow of the cooling medium through said system, and a temperature indicator, the circulation system including a part having a vapor space and through which cooling medium flowing from the jacket passes irrespective of change in flow of the cooling medium under the action of the thermostatically controlled means, and the temperature indicator having its heat-responsive element exposed to vapor in said vapor space.

In testimony whereof I have hereunto set my hand in the presence of two subscribing witnesses.

AUSTIN M. WOLF.

Witnesses:
ETHEL JOHNES,
A. L. KENT.